(12) United States Patent
Leroux

(10) Patent No.: US 11,525,734 B2
(45) Date of Patent: Dec. 13, 2022

(54) OPTICAL DEVICE ALLOWING THE ANGULAR AND SPECTRAL EMISSION OF AN OBJECT TO BE MEASURED SIMULTANEOUSLY

(71) Applicant: ELDIM, Herouville-Saint-Clair (FR)

(72) Inventor: Thierry Leroux, Bavent (FR)

(73) Assignee: ELDIM, Herouville-Saint-Clair (FR)

( * ) Notice: Subject to any disclaimer, the term of this patent is extended or adjusted under 35 U.S.C. 154(b) by 6 days.

(21) Appl. No.: 17/043,493

(22) PCT Filed: Mar. 29, 2019

(86) PCT No.: PCT/FR2019/050742
§ 371 (c)(1),
(2) Date: Mar. 1, 2021

(87) PCT Pub. No.: WO2019/186082
PCT Pub. Date: Oct. 3, 2019

(65) Prior Publication Data
US 2021/0172802 A1 Jun. 10, 2021

(30) Foreign Application Priority Data
Mar. 29, 2018 (FR) ..................................... 1852745

(51) Int. Cl.
*G01J 3/50* (2006.01)
*G01J 3/02* (2006.01)
*G01N 21/95* (2006.01)

(52) U.S. Cl.
CPC ............. *G01J 3/505* (2013.01); *G01J 3/0208* (2013.01); *G01J 3/0229* (2013.01);
(Continued)

(58) Field of Classification Search
CPC ........ G01J 3/505; G01J 3/0208; G01J 3/0229; G01J 3/0237; G01J 3/502; G01J 3/504
See application file for complete search history.

(56) References Cited

U.S. PATENT DOCUMENTS 6,804,001 B1 * 10/2004 Leroux .................. G01N 21/00
356/326

FOREIGN PATENT DOCUMENTS

CN 1796975 A 7/2006
DE 19637131 2/2001
(Continued)

OTHER PUBLICATIONS

International Search Report for International Application No. PCT/FR2019/050742 dated Jul. 26, 2019, 2 pages.
(Continued)

*Primary Examiner* — Rebecca C Bryant
(74) *Attorney, Agent, or Firm* — TraskBritt

(57) ABSTRACT

A system for measuring the spatial distribution of the spectral emission of a measurement zone of an object, comprises: a first objective; means for selecting a portion of an image formed by the first objective; a diaphragm; light-dispersing means located in the vicinity of the diaphragm and allowing the light coming from the selecting means to be dispersed; and a second objective placed between the selecting means and the diaphragm, interacting with the first objective so that the aperture of the diaphragm is optically conjugated with the measurement zone by the first and second objectives. The first objective forms an image on a predetermined Fourier surface on which each point corresponds to an emission direction of the object for one particular wavelength. The selecting means have a selection surface shaped depending on the predetermined. Fourier surface, and the selecting means are placed on the predetermined Fourier surface.

12 Claims, 5 Drawing Sheets

(52) U.S. Cl.
CPC ............. *G01J 3/0237* (2013.01); *G01J 3/502* (2013.01); *G01N 2021/9513* (2013.01)

(56) References Cited

FOREIGN PATENT DOCUMENTS

| EP | 0286529 B1 | | 7/1992 | | |
|----|-----------|---|--------|---|---|
| EP | 3139147 A1 | * | 3/2017 | ............ | G01J 3/0229 |
| FR | 2729220 A1 | | 7/1996 | | |
| FR | 2749388 A1 | | 12/1997 | | |
| WO | 93/21548 A1 | | 10/1993 | | |

OTHER PUBLICATIONS

International Written Opinion for International Application No. PCT/FR2019/050742 dated Jul. 26, 2019, 6 pages.
Boher et al., "New multispectral Fourier optics viewing angle instrument for full characterization of LCDs and their components", SID 08 Digest, ISSN 008-0966X/08/3903, (2008) pp. 1571-1520.
Boher et al., "Viewing angle spectral analysis of OLED display light emission properties", IDW, ISSN 1883-2490/21/0641, 641 (2014) 4 pages.

* cited by examiner

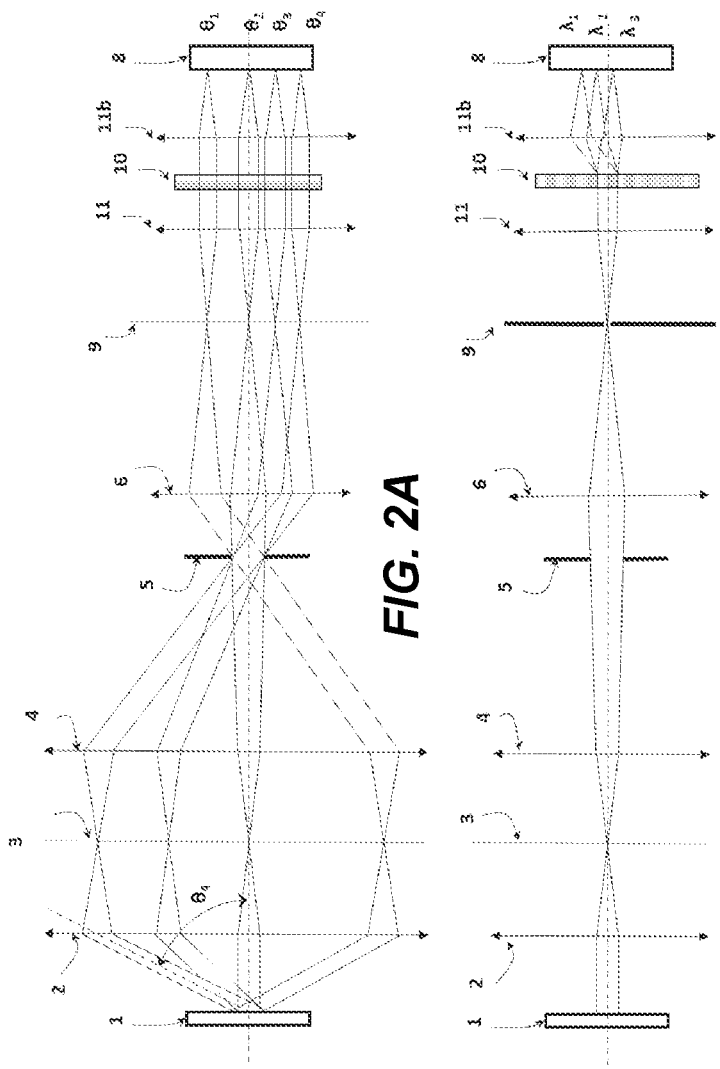

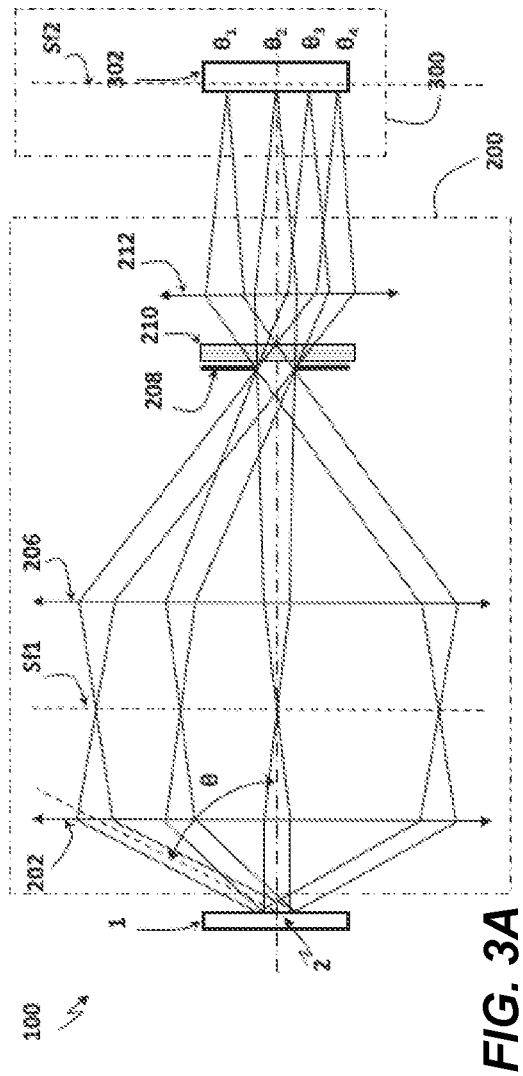
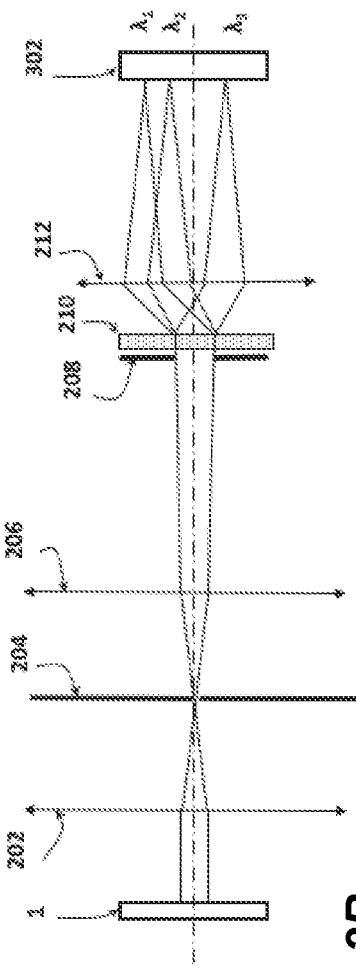
FIG. 3A
FIG. 3B

OPTICAL DEVICE ALLOWING THE ANGULAR AND SPECTRAL EMISSION OF AN OBJECT TO BE MEASURED SIMULTANEOUSLY

CROSS-REFERENCE TO RELATED APPLICATIONS

This application is a national phase entry under 35 U.S.C. § 371 of International Patent Application PCT/FR2019/050742, filed Mar. 29, 2019, designating the United States of America and published as International Patent Publication WO 2019/186082 A1 on Oct. 3, 2019, which claims the benefit under Article 8 of the Patent Cooperation Treaty to French Patent Application Serial No. 1852745, filed Mar. 29, 2018.

TECHNICAL FIELD

The present disclosure relates to a measuring device allowing the angular and spectral distribution of an object to be measured simultaneously. It applies to objects such as emissive screens like liquid crystal screens, plasma screens, electroluminescent screens or other types of screen and lighting devices.

BACKGROUND

Several techniques are already known for measuring the colorimetric characteristics of the emission or reflection of light by various objects.

On this subject, one may refer to the following documents:
[1] EP 0 286 529 B1,
[2] FR 2 729 220 A,
[3] FR 2 749 388 A,
[4] FR 2 800 163 A1,
[5] "Viewing angle spectral analysis of OLED display light emission properties," Pierre Boher, Thierry Leroux, Thibault Bignon, Véronique Collomb-Patton, IDW, ISSN 1883-2490/21/0641, 641 (2014),
[6] "New multispectral Fourier optics viewing angle instrument for full characterization of LCDs and their components," Pierre Boher, Thierry Leroux, Thibault Bignon, David Glinel, SID08, ISSN 008-0966X/08/3903, 1571 (2008).

Electromechanical techniques involving moving a photometer around the object to be measured as described in Reference [1] are very slow, because they are performed by sampling. Each direction studied requires movements of the mechanical system and a special measurement. They are still used, however, because they provide good-quality spectral measurements in the chosen directions if the photometer is replaced by a spectrophotometer.

In order to measure the color on the basis of the observation direction, the technique involving using Fourier optics associated with an imaging sensor is very widely used. It is described in Reference [3]. The principle of this system is represented in FIG. 1 of the present document. It involves using a Fourier objective 2 allowing the light emitted by a zone of the object 1 to be collected, and refocusing each observation direction on a focal surface 3. This surface is reimaged on a two-dimensional sensor 8 by means of field lenses 4 and a transfer objective 6. A diaphragm 5 placed between the field lenses 4 and the transfer objective 6 and optically conjugated with the measurement zone on the object 1 allows the apparent size of the measured zone to be defined independently of the observation direction. Filters 7 arranged near the detector allow the light analyzed by the system to be selected and the colors to be measured.

Measuring the color of the light emitted without knowing its distribution in wavelength can have drawbacks. The accuracy of the colorimetric measurement is usually better if the distribution of the wavelengths is known. In certain cases, the spectral dependency allows the origin of the observed colorimetric shifts to be deduced. This is the case for electroluminescent screens, as explained in Publication [5]. Lastly, in reflectometry on a surface that is not naturally emissive, it is necessary to know the spectrum of the light source used for lighting and its modification after reflecting on the surface.

A possibility of simultaneously measuring the angular and spectral dependency of an emissive object has already been commercially implemented with the aid of Fourier optics [6]. Spectral dependency is measured by a series of short-pass interference filters positioned successively before the imaging sensor instead of colored filters (element 7 in FIG. 1). However, the number of filters is limited (31 filters distributed over the visible range 400 nm-700 nm) and their bandwidth is on the order of 10 nm. The spectral resolution is therefore limited, whereas the resolution required for photometric measurements is at least 4 nm. Moreover, the 31 successive measurements required to obtain the spectral signature take a relatively long time.

The use of an imaging spectrometer combined with Fourier optics has also been patented by the applicant [4]. The principle of this system is shown in FIGS. 2A and 2B. The optical elements are the same as those used in the conventional Fourier system described in Reference [3] and shown in FIG. 1, with the exception of the detection part. The imaging sensor 8 is replaced by a slit 9 passing through the optical axis of the system and selecting one particular azimuth. The spectral analysis is performed using an imaging spectrograph composed of a dispersing element 10, transfer optics 11 and 11b and an imaging sensor 8 located on the other side of the slit. This solution has a certain number of disadvantages. It is complicated to implement because it requires additional optics. Moreover, the alignment of the system is very difficult to achieve. The optics in question must be achromatic as must the entire Fourier optical system located before the selection slit 9, which introduces significant optical constraints for practical realization.

One particular aim of the present disclosure is to totally or partly overcome the above-mentioned drawbacks, and, in particular, to propose a device having a minimum number of components that allows an angular and spectral measurement to be made along one particular azimuth with a satisfactory spectral resolution and a very short measurement time.

BRIEF SUMMARY

According to a first aspect of the present disclosure, a system is proposed for measuring the spatial distribution of the spectral emission of a measurement zone of an object, comprises:
   a first Fourier objective forming an image on a predetermined Fourier surface on which each point corresponds to an emission direction of the object for one particular wavelength,
   means for selecting a portion of the image formed by the first objective corresponding to one particular azimuth of the spectral emission of the object, the selecting means having a selection surface shaped depending on the predetermined Fourier surface, a second Fourier objective arranged after the selecting means cooperating with the first Fourier objective in order to create an image plane optically conjugated with the measurement zone, a diaphragm located on this plane conjugated so that the measurement zone, when it is observed through the diaphragm, has an apparent surface approximately independent of the direction, the first and second objectives having a common optical axis forming the optical axis of the system, light-dispersing means allowing the light coming from the selecting means to be dispersed onto or as close as possible to the diaphragm, a third Fourier objective located after the diaphragm allowing the first Fourier surface to be imaged on a Fourier plane, an imaging sensor arranged on this second Fourier plane allowing the dispersed light to be received and the spectral and angular response of the light coming from one particular azimuth selected by the selecting means located on the first Fourier surface to be determined.

According to the present disclosure, the first objective forms an image on a predetermined Fourier surface (not flat) on which each point corresponds to an emission direction of the object for one particular wavelength, and the selecting means have a selection surface shaped depending on the predetermined Fourier surface, and the selecting means are arranged on the predetermined Fourier surface.

Also, the light-dispersion means are located near the diaphragm.

The diaphragm allows the zone measured on the object with an apparent surface approximately independent of the observation direction to be defined and thus guarantees optimum light collection, even at large observation angles.

Advantageously, the diaphragm can have a circular opening.

The light-dispersing element can be placed before or directly on the diaphragm.

The light-dispersing element can disperse light in a direction perpendicular to the selection direction.

According to one embodiment, the dispersion means can be formed by the combination of a prism, a transmitting network and a prism arranged to disperse the light in one direction and bring the dispersed rays together about the optical axis of the system, the diaphragm being incorporated in this device as close as possible to the transmitting network.

The system according to the present disclosure can also comprise a means of simultaneous rotation of the selecting means and light-dispersion means about the optical axis of the system.

According to a second aspect of the present disclosure, a method for measuring the spatial distribution of the spectral emission of a measurement zone of an object by a system is proposed, the system comprising:

a first Fourier objective forming an image on a predetermined Fourier surface on which each point corresponds to an emission direction of the object for one particular wavelength, means for selecting a portion of an image formed by the first objective, a second Fourier objective arranged after the selecting means cooperating with the first Fourier objective in order to create an image plane optically conjugated with the measurement zone, a diaphragm located on this conjugated plane so that the measurement zone, when it is observed through the diaphragm, has an apparent surface approximately independent of the direction, the first and second objectives having a common optical axis forming the optical axis of the system, light-dispersion means, located in the vicinity of the diaphragm allowing the light coming from the selecting means to be dispersed, a third Fourier objective located after the diaphragm allowing the first Fourier surface to be imaged onto a Fourier plane, an imaging sensor arranged on this second Fourier plane and allowing the dispersed light to be received and the spectral and angular response of the light coming from one particular azimuth selected by the selecting means to be determined.

The method according to the present disclosure comprises the following steps:

a determination of a predetermined Fourier surface (not flat) on which each point corresponds to an emission direction of the object for one particular wavelength, a formation of an image by the first objective on the predetermined Fourier surface, a selection by selecting means having a selection surface shaped depending on the predetermined Fourier surface, and arranged on the predetermined Fourier surface.

BRIEF DESCRIPTION OF THE DRAWINGS

Further advantages and features of the present disclosure will emerge from the following detailed description of implementations and embodiments that are in no way limiting, with reference to the accompanying drawings in which:

FIGS. 2A and 2B represent a schematic illustration of a system according to the prior art;

FIGS. 3A and 3B represent a schematic illustration of a system according to the present disclosure;

DETAILED DESCRIPTION

Figure 1:
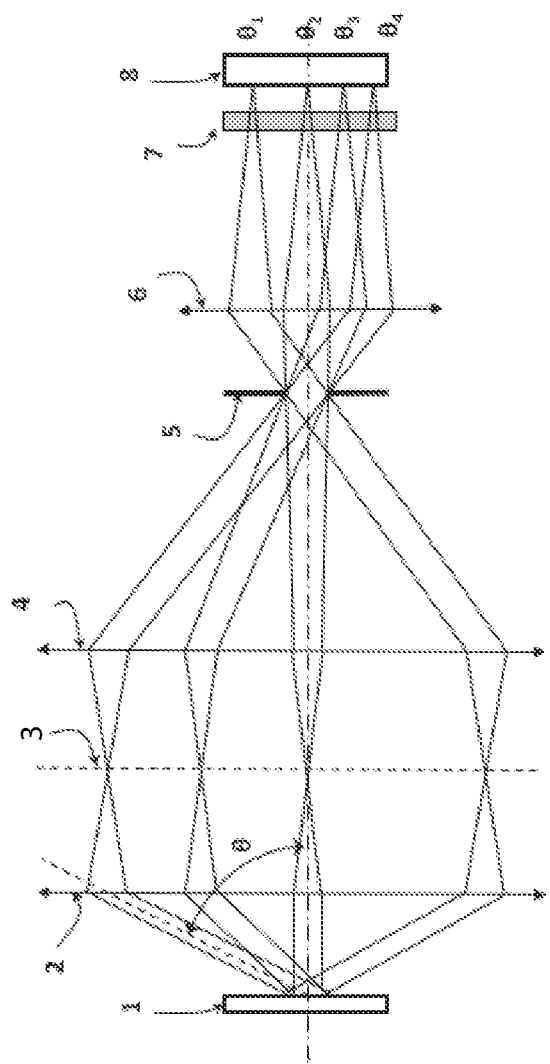
FIG. 1 represents a schematic illustration of a system according to the prior art.

As the embodiments described below are in no way limiting, it is possible, in particular, to regard variations of the present disclosure as comprising only a selection of the characteristics described, if this selection of characteristics is sufficient to confer a technical advantage or to distinguish embodiments of the present disclosure from the prior state of the art. This selection comprises at least one, preferably functional characteristic, with no structural details or with only part of the structural details if that part alone is sufficient to confer a technical advantage or to distinguish the embodiments of the present disclosure from the prior state of the art.

FIG. 3A represents, in an observation plane of a system according to the present disclosure:

an object 1 for which the spatial distribution of the spectral emission of a measurement zone 2 is to be measured, a system 100 according to the present disclosure according to the observation plane, determined by an optical axis of the system 100 and an observation direction of the measurement zone 2.

The system 100 comprises:
an imaging part 200, and
a detection part 300.

The imaging part 200 comprises a first converging objective 202, a selecting slit 204, a second converging objective 206, a diaphragm 208 and light-dispersion means 210 located as close as possible to the diaphragm 208 and allowing the light coming from one particular azimuth and selected by the selecting slit 204 to be dispersed, and a third objective 212.

The surface of object 1 under analysis is placed in the focal plane of the first objective 202.

The measurement zone 2 and the first objective 202 define a surface Sf1, not flat, called a Fourier surface, which is such that any beam from the measurement zone 2 converges on this surface.

According to the present disclosure, the selection slit 204 (shown more clearly in FIG. 4A) is shaped depending on the predetermined surface Sf1 and arranged on surface Sf1.

In the embodiment under consideration, a slit formed in an opaque material is used, arranged on a surface having an axis of revolution coinciding with the optical axis of the system. The slit allows one particular azimuth to be selected.

The second objective 206 is arranged between the first objective 202 and the diaphragm 208, so that it has an optical axis that coincides with that of the first objective 202, defining the optical axis of the system.

The second objective 206 is also arranged so that the opening of the diaphragm 208 is optically conjugated with the measurement zone 2 by the first and second objectives.

The measurement zone 2, when observed through the diaphragm 208, has an apparent surface independent of the observation direction.

The light-dispersion means 210 comprise in combination a prism, a transmitting network and a prism allowing the light to be dispersed in a direction perpendicular to the selection slit 204 and to bring the dispersed rays together about the optical axis of the system.

The diaphragm 208 is incorporated into this device as close as possible to the transmitting network.

These dispersion means are arranged before the objective 212.

The objective 212 is arranged so that its optical axis coincides with the optical axis of the system 100, between the diaphragm 208 and the detection part 300. It is also arranged so that the Fourier surface Sf1 is reimaged on a secondary Fourier plane Sf2 by means of a second objective 206.

The dispersing element 210 and the transfer optics of third objective 212 serve as an imaging spectrograph, which is much simpler than that according to the prior art.

FIG. 3B is a schematic view of the system 100 in FIG. 3A, in the plane that is perpendicular to the straight analysis section, that is to say, in the dispersion plane.

The detection part 300 comprises an imaging sensor 302 arranged on the secondary Fourier plane Sf2 and allowing the dispersed light to be received and the spectral and angular response of the light coming from one particular azimuth selected by the slit 204 to be determined.

The imaging sensor 302 is a two-dimensional sensor (comprising, for example, a matrix of photodetectors or a CCD) and makes it possible to analyze, for a given position of the selecting means, on one hand, in one direction, the light intensity depending on the angle theta and on the other, in the perpendicular direction, the light intensity depending on the wavelength. Advantageously, this sensor is arranged so that its axes correspond to these two directions.

Figures 4A, 4B:
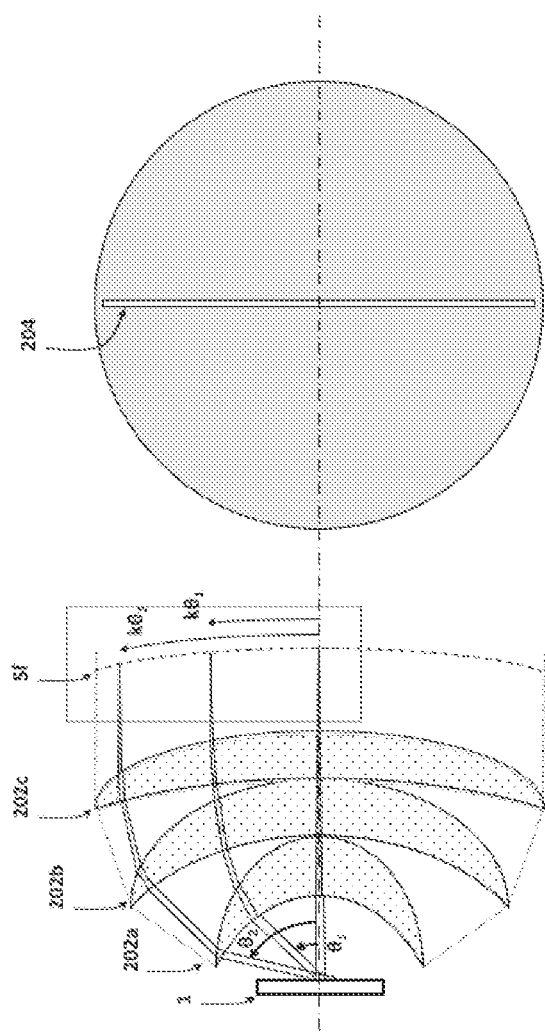
FIGS. 4A and 4B show an embodiment of the Fourier optics of a system according to the present disclosure and the selecting means associated with the optics.

FIG. 4A shows an embodiment of the Fourier optics of first objective 202 including three lenses. The light beams at various angles are progressively brought toward the direction of the optical axis by passing through these three lenses 202a, 202b, 202c. The Fourier surface Sf1 is not a plane but rather a rotationally symmetrical surface.

The slit 204 selecting one azimuth is generated on an object of revolution as shown in FIG. 4B.

Figure 5A:
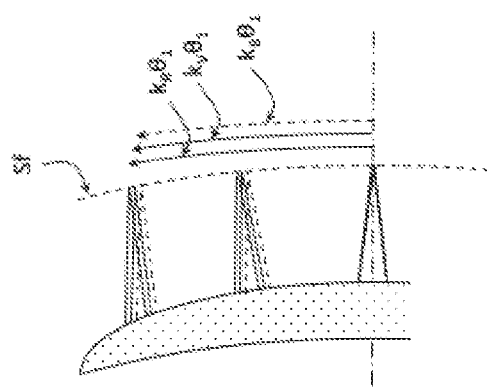
FIGS. 5A and 5B are schematic representations of the effect of the transverse chromatism of the Fourier optics represented in FIGS. 4A and 4B, at the Fourier surface.

FIG. 5A is a schematic representations of the effect of transverse chromatism of the Fourier optics of first objective 202 at the Fourier surface Sf.

For a given light beam collected at a collection angle θ on the object 1, each wavelength λ is focused at a point more or less distant from the optical axis of the system. FIG. 5A shows this effect, in particular, for the collection angle $\theta_1$, for three different wavelengths $k_R\theta_1$, $k_V\theta_1$ and $k_B\theta_1$.

The effect is usually increasingly greater as the angle θ increases.

Figure 5B:
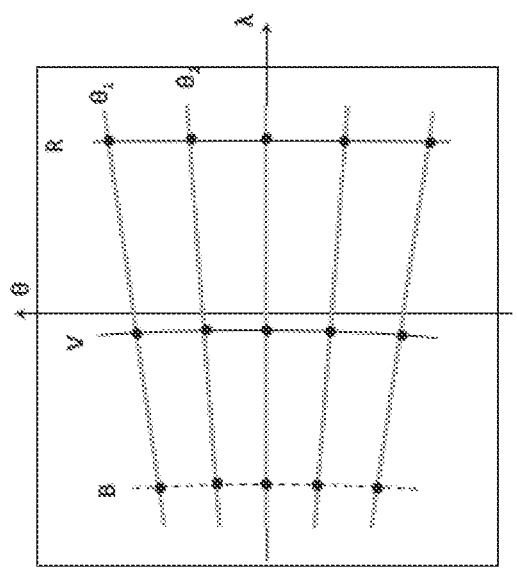

The consideration of this effect by calibrating the pixel/pair correspondence (θ, λ) on the imaging sensor 302 can be achieved as proposed in FIG. 5B.

In a preferred embodiment, the field lenses generate, for each particular direction coming from the selection slit, a quasi-collimated beam on the diaphragm 208. This is technically possible because the design constraints of these lenses are fewer than in the conventional Fourier system analyzing the entire Fourier plane (Reference [3] and FIG. 1). In fact, the conventional Fourier system must be perfectly achromatic, with one particular emission direction having to be focused at the same point on the surface of the imaging sensor, whatever the wavelength. This is achieved in the conventional system by correcting the inevitable chromatism of the Fourier optics 2 by means of the field lenses 4 and transfer optics 7.

This is not the case in the device of the present disclosure. In fact, the design constraints of the Fourier optics of first objective 202 are reduced: all that is required is that the longitudinal chromatism is minimal in the spectral range concerned (typically the visible range). In fact, the various spectral components of the light beams collected on the object must be perfectly focused on the same focal surface Sf1 that constitutes the Fourier surface. By contrast, transverse chromatism poses no problem, as shown by FIGS. 5A and FIG. 5B. In fact, the light beams coming from the same angles of the object 1 can without difficulty be focused on the different points of the Fourier surface. This is shown schematically in FIG. 5A, which illustrates a detail of FIG. 4A for red (R), green (V) and blue (B) beams coming from three different angles of incidence. The position of the beams coming from the same angle of incidence on the surface of the object 1 can be different with no major drawback, because the additional spectral dispersion allows the contributions to be separated. This results merely in a different calibration of the pixel/angle correspondence on the imaging sensor for the various wavelengths analyzed, as shown in FIG. 5B.

The spectral analysis can be extended to other azimuths by adding a simultaneous rotation means of certain elements of the system. The elements of selection slit 204 and light-dispersion means 210 can be mounted in a rotationally fixed manner. It is thus possible to reconstruct the entire analysis zone by scanning. In fact, if the selection slit 204 and the light-dispersing means 210 are simultaneously rotated about the optical axis of the system, it is consecutively possible to achieve a real-time spectral analysis of an entire series of azimuths provided that the pixel/angle and wavelength dependency for each position of the two elements in question have been correctly calibrated. A spectral analysis of the entire angular aperture of the emissive object can thus be achieved rapidly and with a high angular resolution.

Clearly, the present disclosure is not limited to the embodiments that have just been described, and many modifications can be made to these embodiments without departing from the scope of the invention as defined by the claims. Moreover, the different characteristics, forms, variations and embodiments of the present disclosure can be associated with one another according to different combinations provided that they are not incompatible with or exclusive of one another.

The invention claimed is:

1. A system for measuring a spatial distribution of a spectral emission of a measurement zone of an object comprising, successively, along an optical axis of the system:
   a first Fourier objective forming an image on a predetermined Fourier surface on which each point corresponds to an emission direction of the object for one particular wavelength,
   selecting means for selecting a portion of the image formed by the first Fourier objective corresponding to one particular azimuth of the spectral emission of the object, the selecting means having a selection surface shaped depending on the predetermined Fourier surface, the selecting means being arranged on the predetermined Fourier surface so as to select one particular azimuth of the spectral emission on the object,
   a second Fourier objective arranged after the selecting means cooperating with the first Fourier objective to create an image plane optically conjugated with the measurement zone,
   a diaphragm located on the image plane conjugated so that the measurement zone, when it is observed through the diaphragm, has an apparent surface approximately independent of the emission direction, the first and second Fourier objectives having a common optical axis forming the optical axis of the system, and
   light-dispersing means allowing light coming from the selecting means to be dispersed onto or as close as possible to the diaphragm, the light-dispersing means located in a vicinity of the diaphragm,
   a third Fourier objective located after the diaphragm allowing the predetermined Fourier surface to be imaged on a Fourier plane, and
   an imaging sensor arranged on this second Fourier plane allowing the dispersed light to be received and a spectral and angular response of the light coming from one particular azimuth selected by the selecting means to be determined.

2. The system of claim 1, wherein the diaphragm has a circular opening.

3. The system of claim 2, wherein the light-dispersing means are formed by the combination of a prism, a transmitting network and a prism arranged to disperse the light in one direction and bring the dispersed rays together about the optical axis of the system, the diaphragm being located as close as possible to the transmitting network.

4. The system of claim 3, further comprising means of simultaneous rotation of the selecting means and light-dispersing means about the optical axis of the system.

5. The system of claim 1, wherein the light-dispersing means are formed by the combination of a prism, a transmitting network and a prism arranged to disperse the light in one direction and bring the dispersed rays together about the optical axis of the system, the diaphragm being incorporated in this device as close as possible to the transmitting network.

6. The system of claim 1, further comprising means of simultaneous rotation of the selecting means and light-dispersing means about the optical axis of the system.

7. A method for measuring a spatial distribution of a spectral emission of a measurement zone of an object, the method comprising:
   providing an optical system comprising, successively along an optical axis of the optical system:
      a first Fourier objective forming an image on a predetermined Fourier surface on which each point corresponds to an emission direction of the object for one particular wavelength,
      selecting means for selecting a portion of the image formed by the first Fourier objective corresponding to one particular azimuth of the spectral emission of the object, the selecting means having a selection surface shaped depending on the predetermined Fourier surface, the selecting means being arranged on the predetermined Fourier surface so as to select one particular azimuth of the spectral emission on the object,
      a second Fourier objective arranged after the selecting means cooperating with the first Fourier objective to create an image plane optically conjugated with the measurement zone,
      a diaphragm located on the image plane conjugated so that the measurement zone, when it is observed through the diaphragm, has an apparent surface approximately independent of the emission direction, the first and second Fourier objectives having a common optical axis forming the optical axis of the optical system, and
      light-dispersing means allowing light coming from the selecting means to be dispersed onto or as close as possible to the diaphragm, the light-dispersing means located in a vicinity of the diaphragm,
      a third Fourier objective located after the diaphragm allowing the predetermined Fourier surface to be imaged on a Fourier plane, and
      an imaging sensor arranged on this second Fourier plane allowing the dispersed light to be received and a spectral and angular response of the light coming from one particular azimuth selected by the selecting means to be determined; and
   using the optical system to measure the spatial distribution of the spectral emission of the measurement zone of the object.

8. The method of claim 7, wherein the diaphragm of the optical system has a circular opening.

9. The method of claim 8, wherein the light-dispersing means of the optical system are formed by the combination of a prism, a transmitting network and a prism arranged to disperse the light in one direction and bring the dispersed rays together about the optical axis of the optical system, the diaphragm being located as close as possible to the transmitting network.

10. The method of claim 9, wherein the optical system further comprises means of simultaneous rotation of the selecting means and light-dispersing means about the optical axis of the optical system.

11. The method of claim 7, wherein the light-dispersing means of the optical system are formed by the combination of a prism, a transmitting network and a prism arranged to disperse the light in one direction and bring the dispersed rays together about the optical axis of the optical system, the diaphragm being incorporated in this device as close as possible to the transmitting network.

12. The method of claim 7, wherein the optical system further comprises means of simultaneous rotation of the selecting means and light-dispersing means about the optical axis of the optical system.

\* \* \* \* \*